(12) United States Patent
Dimou et al.

(10) Patent No.: US 9,184,968 B2
(45) Date of Patent: Nov. 10, 2015

(54) APPARATUSES, METHODS, AND COMPUTER PROGRAM PRODUCTS FOR SELECTING A CYCLIC PREFIX LENGTH

(71) Applicant: Telefonaktiebolaget L M Ericsson (publ), Stockholm (SE)

(72) Inventors: Konstantinos Dimou, Stockholm (SE); Jan-Erik Berg, Sollentuna (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 49 days.

(21) Appl. No.: 13/944,058

(22) Filed: Jul. 17, 2013

(65) Prior Publication Data
US 2015/0023439 A1    Jan. 22, 2015

(51) Int. Cl.
| H04K 1/10 | (2006.01) |
| H04L 27/28 | (2006.01) |
| H04L 27/26 | (2006.01) |
| H04B 15/00 | (2006.01) |
| H04L 1/00 | (2006.01) |

(52) U.S. Cl.
CPC .......... *H04L 27/2605* (2013.01); *H04B 15/00* (2013.01); *H04L 1/0006* (2013.01); *H04L 27/2607* (2013.01)

(58) Field of Classification Search
CPC .............. H04L 27/2605; H04L 1/0006; H04L 27/2607; H04B 15/00
USPC ........................................................ 375/260
See application file for complete search history.

(56) References Cited

U.S. PATENT DOCUMENTS

| 6,915,113 | B1 * | 7/2005 | Cardiff ...................... 455/67.14 |
| 2004/0082356 | A1 * | 4/2004 | Walton et al. ................ 455/522 |
| 2006/0148414 | A1 * | 7/2006 | Tee et al. ........................ 455/69 |
| 2008/0002645 | A1 * | 1/2008 | Seki et al. ..................... 370/338 |
| 2009/0122771 | A1 * | 5/2009 | Cai ................................ 370/338 |
| 2009/0180559 | A1 * | 7/2009 | Hsu et al. ..................... 375/260 |
| 2012/0281551 | A1 | 11/2012 | Alanara |

FOREIGN PATENT DOCUMENTS

| EP | 1873989 A1 | 1/2008 |
| EP | 2081342 A1 | 7/2009 |

OTHER PUBLICATIONS

Abdi, A. and Tepedelenlioglu, C. and Kaveh, M. and Giannakis, G., "On the estimation of the K parameter for the Rice fading distribution", IEEE Communications Letters, Mar. 2001, p. 92-94.*
New Postcom, "Discussion on CP length", R1-124341, 3GPP TSG RAN WG1 Meeting #70Bis, San Diego, US, Oct. 8-12, 2012.*
Panasonic, "Discussion on CP length and intra-band CA", R1-133198, 3GPP TSG-RAN WG1 Meeting 74, Barcelona, Spain, Aug. 19-23, 2013.*

(Continued)

*Primary Examiner* — Nader Bolourchi
(74) *Attorney, Agent, or Firm* — Rothwell, Figg, Ernst & Manbeck, P.C.

(57) ABSTRACT

Methods, devices, and computer program products for energy and/or cost efficient selection of cyclic prefix length, based at least in part on consideration of propagation and channel conditions, are disclosed. The conditions can relate to, for example, the frequency selectivity and time dispersion of a radio channel, as well as its radio propagation profile and environmental conditions.

23 Claims, 10 Drawing Sheets

(56) References Cited

OTHER PUBLICATIONS

RAN WG4, "LS response on the CP length assumption with FeICIC", R1-123005, 3GPP TSG RAN WG1 meeting #69, Prague, Czech Republic, May 21-25, 2012.*

International Search Report and Written Opinion issued in corresponding PCT Application No. PCT/IB2014/062927 on Dec. 1, 2014, 11 pages.

Ilic-Delibasic, M., et al., "A Novel Ricean Fading Channel Model with Random K Factor", Wireless Telecommunications Symposium (WTS), 2012, IEEE, Apr. 18, 2012, pp. 1-5, XP032221670.

Written Opinion of the International Preliminary Examining Authority issued on Jun. 17, 2015 in corresponding International Application No. PCT/182014/062927, 6 pages.

* cited by examiner

APPARATUSES, METHODS, AND COMPUTER PROGRAM PRODUCTS FOR SELECTING A CYCLIC PREFIX LENGTH

TECHNICAL FIELD

This disclosure relates generally to improving transmission quality and/or energy efficiency in wireless networks and, more particularly, to methods, apparatuses, and computer program products for selecting a cyclic prefix length.

BACKGROUND

Machine-to-machine (M2M) communication is becoming an increasingly critical consideration in the development of future communication technologies. In M2M communications, machine type communication (MTC) devices such as smart meters, signboards, cameras, remote sensors, laptops, and appliances typically utilize a wireless communication network to transmit data to a receiving host (e.g., a data collection server). MTC devices may differ dramatically from other wireless communication devices (WCDs). For instance, many MTC devices are designed to wirelessly transmit sporadic bursts of one or a few short packets containing measurements, reports, and triggers, such as temperature, humidity, or wind speed readings. In some cases, MTC devices are expected to be installed in a fixed location or have low mobility.

Some M2M services (and devices) often place different requirements on a wireless network than traditional services, such as voice and web streaming. Another distinguishing characteristic in wireless networks with M2M communications is the increasingly large number of MTC devices. Both of these characteristics bring forth new challenges for wireless communication networks to develop a cost, spectrum, and energy efficient radio access technology that can be used in M2M applications and MTC devices.

For example, MTC devices are typically low complexity devices, targeting low-end (low average revenue per user, low data rate, high latency tolerances, etc.) applications. These devices often have severe limitations on power/energy consumption as well as cost. Cost may be understood, for example, with respect to both the cost of manufacturing a device as well as the cost for operating the device. For example, a given device manufactured with a slower processor in the reception chain can have lower manufacturing costs than a similar device with a faster processor. In some aspects, operating costs may be associated with the energy consumed during operation. Several factors can affect the cost of manufacturing and operating a given device. These cost drivers may include, for instance, processing speed (mainly at reception), the number of antennas, and operational bandwidth.

In addition to cost constraints, because of an industry evolution towards M2M communications, the number of radio links between stationary devices is expected to increase significantly in the next generation of communication systems. One reason for this anticipated evolution is the likely increase of wireless backhaul links, due to the expected higher density of radio network deployment and due to the introduction of multi-hop communications involving several hops between communicating end users. Presently, this type of wireless link does not typically require very advanced link adaptation due to the lower degree of radio channel variations.

These differences are compounded by the fact that wireless networks supporting M2M communications may be required to serve a significantly larger number of devices than is typical required in conventional wireless networks, as MTC devices are expected to be cheap and widely deployed. As a result, designing for M2M communications in a wireless communication network creates several challenges.

Considering the anticipated high variety of radio links in the next generation of wireless communications systems, proposals have been provided that target this differing nature of wireless links. For example, it has been proposed to modify the radio interface such that every feature of the physical layer processing can be adapted according to the channel type, traffic to be exchanged, and hardware capabilities of the involved end user devices. In this respect, and upon consideration that future wireless access is likely going to be based in an Orthogonal Frequency Division Modulation (OFDM) variant, it has been proposed to modify the physical resource block (PRB) size and the sub-carrier size, according to the channel variations, device type, and traffic type to be exchanged. The reduction of PRB size is likely related to the lower amount of traffic to be exchanged. The change in sub-carrier size is likely related to the expected lower hardware capability and cost, and consequently, the reduction in energy consumption of the given device involved.

A cyclic prefix (CP) can be used in OFDM systems to, inter alia, mitigate inter-symbol interference (ISI). Such interference is often attributable to multipath propagation. In some cases, the last part of the transmitted symbol is transmitted at the beginning of the symbol. Thus, an ambiguity that might be observed at the end of the frame due to the existence of different symbols can be resolved where the first part of the signal is also used. Presently, in 3GPP LTE (Advanced), there are three different cyclic prefix configurations. In the most common configuration, the cyclic prefix length (in seconds) is equal to 5.2 and 4.7 microseconds, within an OFDM symbol length of 66.67 microseconds. This corresponds to an overhead of 7.24% and 6.59% respectively, if overhead is calculated as the ratio of the cyclic prefix length to the sum of the cyclic prefix and symbol length.

SUMMARY

According to some embodiments, methods, apparatuses, and computer program products provide for cyclic prefix length adaptation based upon, at least in part, consideration of the multipath characteristics of a radio propagation profile, as well as time dispersion of the channel. One significant advantage that results from cyclic prefix length adaptation is a reduction in signaling overhead.

In certain aspects, an adaptation method may be applied with respect to radio channels between stationary devices and/or with respect to radio channels that have low estimated time dispersion. Factors that can affect the radio channel time dispersion include, for example, the cell size and multipath profile, such as frequency selectivity. In some embodiments, the Rician K factor and/or existence of a Line of Site (LOS) coefficient in the radio channel can give indications about the time dispersive nature of the radio channel, and thus, may be considered in a cyclic prefix adaptation process. In addition, signaling of cyclic prefix length can be accomplished using a synchronization signal or sequence.

In some embodiments a method for selecting a cyclic prefix length in a communications network having a first wireless communication device (WCD) (e.g., an MTC device or a conventional WCD) and a second WCD (e.g., an access node or any other suitable type of WCD) is provided. The method includes obtaining, at a control unit, a first value indicative of the time dispersion of a radio channel between the first WCD and the second WCD and a second value indicative of a radio propagation profile of the radio channel between the first WCD and the second WCD. The method also includes determining, by the control unit, whether a set of conditions is true, where the determining comprises: i) determining whether the first value satisfies a first condition; and ii) determining whether the second value satisfies a second condition. The control unit performs a first cyclic prefix length selection procedure in response to determining that the set of conditions is true. The control unit is also configured to perform a second cyclic prefix length selection procedure, which is different than the first cyclic prefix length selection procedure, in response to determining that the set of conditions is not true.

According to some embodiments, the first value indicates the frequency selectivity of the radio channel and the determination of whether the first value satisfies the first condition includes determining whether the first value is not greater than a threshold frequency selectivity value.

According to some embodiments, the second value is a Rician K factor and the determination of whether the second value satisfies the second condition includes determining whether the Rician K factor is not less than a threshold Rician K factor.

In some embodiments, the method is performed by a control unit that is a component of one of the first WCD, the second WCD, and a control node.

In some embodiments a control unit for selecting a cyclic prefix length is provided. The control unit includes a processor and a memory, where the memory stores instructions executable by the processor such that the control unit is operative to obtain a first value that is indicative of a frequency-dependent property of a radio channel between a first wireless communication device (WCD) and a second WCD, as well as obtain a second value that is indicative of multipath or dispersion property of the radio channel between the first WCD and the second WCD. The control unit is also operable to determine whether a set of conditions is true by, at the least, determining whether the first value satisfies a first condition and determining whether the second value satisfies a second condition. Additionally, the control unit is operable to perform a first cyclic prefix length selection procedure in response to determining that the set of conditions is true, and perform a second cyclic prefix length selection procedure, which is different than the first cyclic prefix length selection procedure, in response to determining that the set of conditions is not true.

In some embodiments, a control unit for selecting a cyclic prefix length is provided, which is adapted to obtain a first value that is indicative of a frequency-dependent property of a radio channel between a first wireless communication device (WCD) and a second WCD, and obtain a second value that is indicative of multipath or dispersion property of the radio channel between the first WCD and the second WCD. The control unit is also adapted to determine whether a set of conditions is true by, at the least, i) determining whether said first value satisfies a first condition and ii) determining whether said second value satisfies a second condition. The control unit is also adapted to perform a first cyclic prefix length selection procedure in response to determining that the set of conditions is true, and perform a second cyclic prefix length selection procedure, which is different than the first cyclic prefix length selection procedure, in response to determining that the set of conditions is not true.

Many devices, such as static MTC devices (e.g., immobile MTC devices or MTC devices with low mobility), may be exposed to harsh conditions, such as extreme weather conditions, which can affect the properties and quality of a radio link. Accordingly, in some embodiments, the process of cyclic prefix length selection can include consideration of weather factors and conditions. Additionally, selection can include consideration of whether a first path is the strongest path, as well as cell size and geographic concerns.

In some instances, aspects of the present disclosure may be applicable, for example, to base stations, home relay nodes, high end terminals (or mobile phones), low end wireless sensors/devices in machine-type communication (MTC) and devices implementing M2M communications.

BRIEF DESCRIPTION OF THE DRAWINGS

The accompanying drawings, which are incorporated herein and form part of the specification, illustrate various embodiments of the present disclosure and, together with the description, further serve to explain the principles of the disclosure and to enable a person skilled in the pertinent art to make and use the embodiments disclosed herein. In the drawings, like reference numbers indicate identical or functionally similar elements.

DETAILED DESCRIPTION

Particular embodiments are directed to methods, devices, and computer program products for energy and/or cost efficient selection of cyclic prefix length based, at least in part, on consideration of radio link characteristics, such as frequency dependent and dispersive propagation values of the channel. The values can relate to, for example, the frequency selectivity and multipath propagation profile of the channel.

A limited discussion of the relationship between the channel impulse response in the frequency domain and the maximum or root mean square (rms) delay spread has been provided in various academic publications. For instance, Henrik Schöber et al., "Delay Spread Estimation For OFDM Based Mobile Communication Systems;" Hüseyin Arslan and Tevfik Yucek, "Delay Spread Estimation For Wireless Communications Systems", Proceedings of the Eighth IEEE International Symposium on Computers & Communications (ISCC'03); Khalid Hassan et al., "The Mathematical Relationship Between Maximum Access Delay & The RMS Delay Spread", ICWMC 2011, The $7^{th}$ International Conference on Wireless & Mobile Communications; and F. Sanzi and J. Speidel, "An Adaptive Two-Dimensional Channel Estimator For Wireless OFDM With Application to Mobile DVB-T", IEEE Transactions on Broadcasting, Vol 46, No. 2, June 2000, pp. 128-133 have addressed issues including estimating the channel impulse response and maximum delay spread, as well as cyclic prefix adaptation.

However, existing methods for flexible radio interface configuration, as well as methods for minimizing signaling overhead, and thus, limiting energy consumption, do not suggest how to adapt the various physical layer processing components to accomplish the desired cost and energy savings. There is also no suggestion of the circumstances in which an adaptation should be performed, and when to deviate from default layer 1 parameters. Further, there is a need for methods, devices, and computer program products that can selectively adapt a cyclic prefix length based on the specific characteristics of a radio link.

Figure 1:
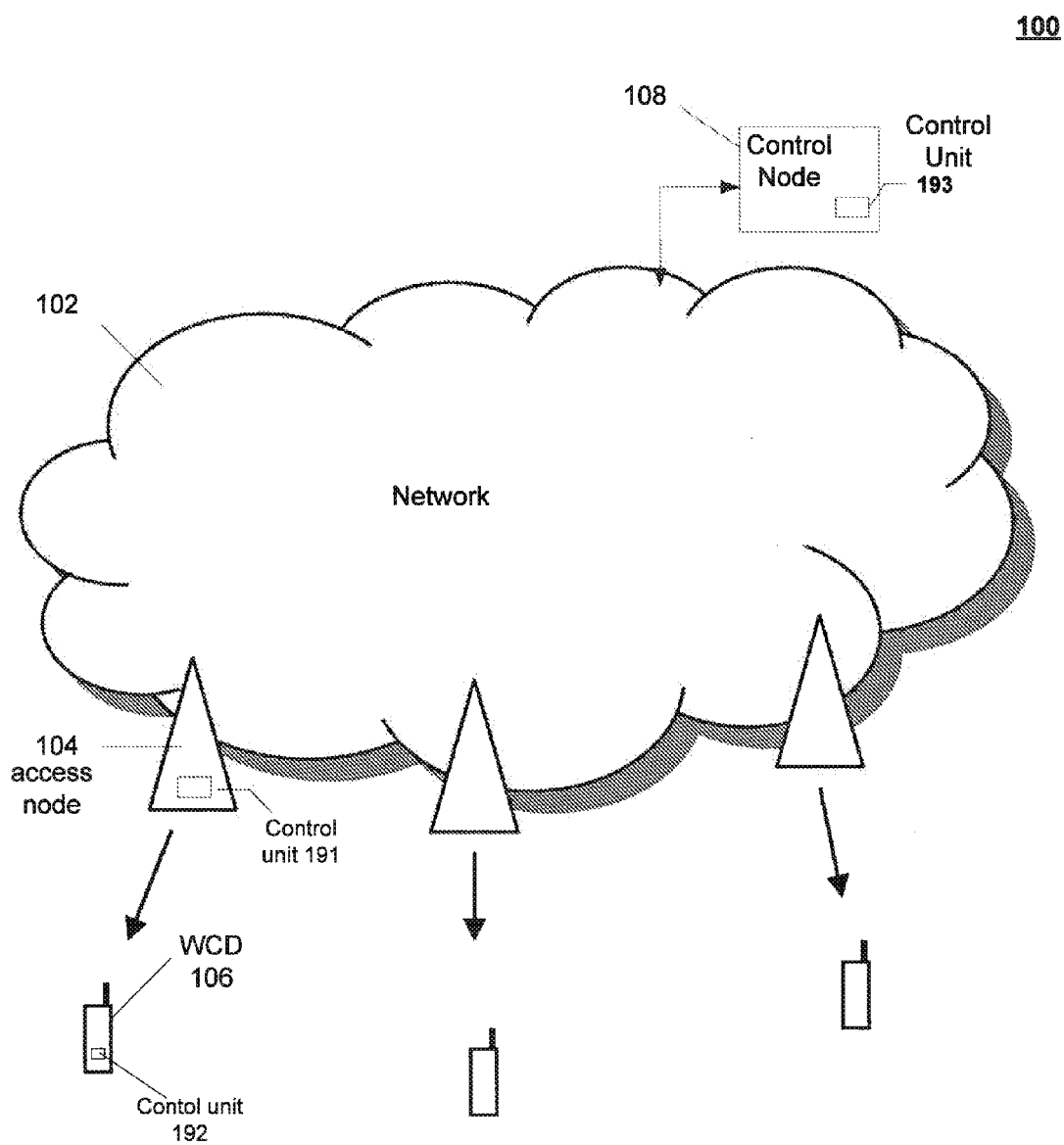
FIG. 1 is an illustration of a wireless communication system in accordance with exemplary embodiments.

Referring to FIG. 1, a wireless communication system 100 in accordance with exemplary embodiments includes an access node 104 serving a WCD 106, which may be a static WCD, such as a static MTC device. Access node 104 may be, for example, a base station, relay node, or gateway type device, and is capable of communicating with WCD 106 and capable of communicating (directly or indirectly) with a control node 108 via, for example, a network 102. Control node 108 may be, for example, a Radio Network Controller (RNC), a Mobile Switching Center (MSC), a Base Station Subsystem (BSS), a Mobility Management Entity (MME), etc. Although control node 108 is explicitly identified as a control node, each of nodes 104, 106, and 108 may be understood as a "control" node to the extent that it includes a control unit or otherwise implements control functions.

Figure 2:
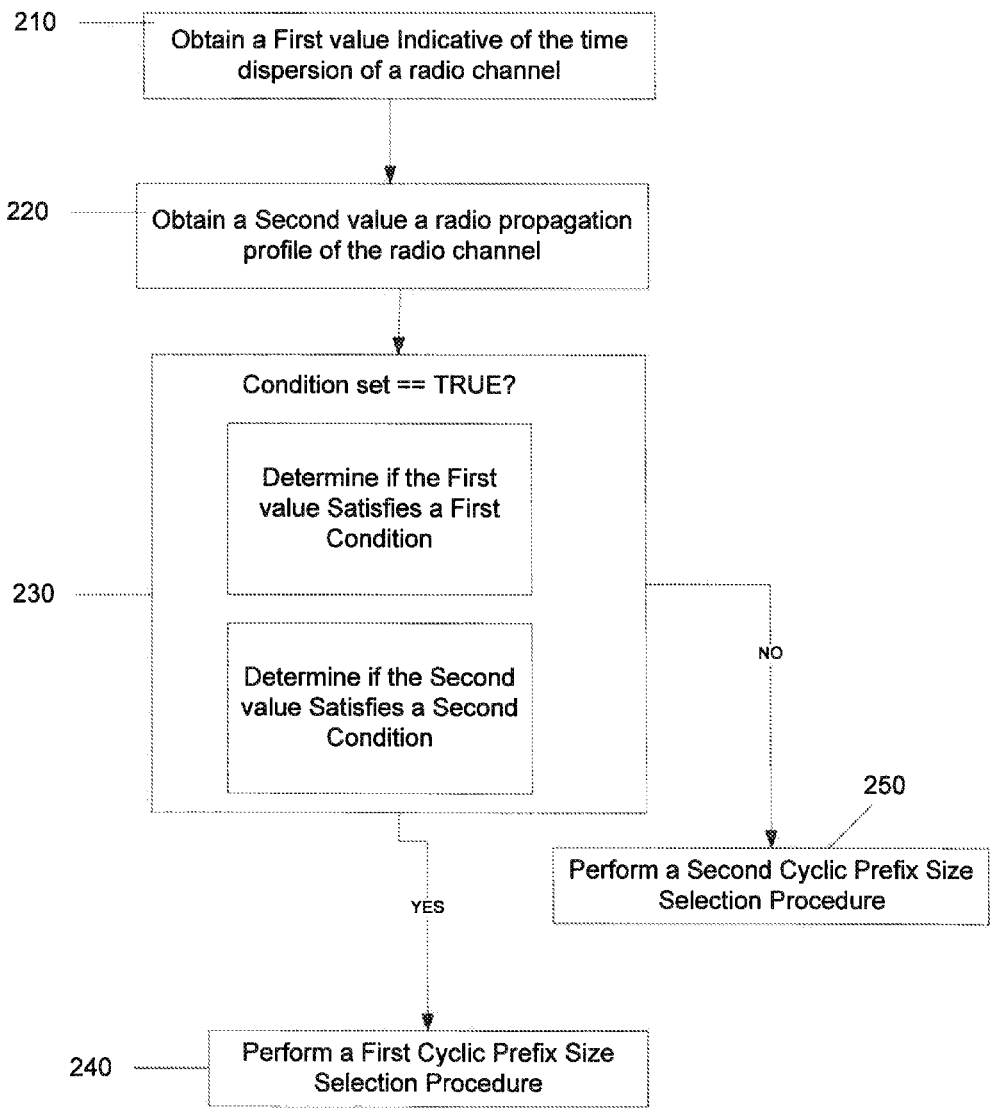
FIG. 2 is a flow chart illustrating a selection process in accordance with exemplary embodiments.

Referring now to FIG. 2, a process 200 is shown for selecting a cyclic prefix length for use in a communication session between a first WCD and a second WCD (such as WCD 106) by, e.g., selecting between a default length and an adapted length. In particular, FIG. 2 illustrates an example of process 200 in which the first WCD is represented by WCD 106 from network 102 of FIG. 1 and the second WCD is represented by access node 104 of network 102. The process 200 may be performed, for instance, by access node 104, WCD 106, and/or control node 108 to select transmission parameters for communications between WCD 106 and access node 104. For example, WCD 106 may be a static MTC device being served by access node 104, which may be a serving base station of network 102 or a relay node.

In step 210, a first value that is indicative of the time dispersion of a radio channel between WCD 106 and access node 104 is obtained. The value may be obtained, for example, by a control unit 191 of access node 104, a control unit 192 of WCD 106, or a control unit 193 of control node 108. In some embodiments, the time dispersion value may be a frequency selectivity value, and may be measured by the control unit, or a device directly connected to the control unit. The control unit 191, 192, 193 may obtain the time dispersion value from another device that communicates the value to the control unit.

In step 220, a second value that is indicative of a radio propagation profile of the radio channel is obtained. The value may be obtained, for example, by control unit 191, 192, or 193. In some embodiments, the propagation value may be a Rician K factor. The propagation value may be measured by the control unit, or a device directly connected to the control unit. The propagation value may also be determined by another device and then communicated to the control unit.

According to some embodiments, methods for reducing cyclic prefix length, and therefore reducing signaling overhead, including the process 200, may be particularly useful with respect to a channel that is static and non-static channels in situations in which the channel in not varying significantly and/or when there is an environment with a low estimated time dispersion of the channel. The Rician K factor can be helpful in determining whether adapting the cyclic prefix length may be useful because the probability of a small channel variation is increased when the Rician K factor is high. A high K factor essentially means that the strongest channel path, also referred to as a "component," is higher, or even significantly higher, than other components. In practice, this may mean that when the K factor is high, there is a Line of Sight (LOS) component or very strong diffracted or reflected path. As such, fast fading is not as severe as in other channel profiles with several paths having equal power profiles. In the case of a high K factor, variation of the channel due to interfering third-party users is lower than in other cases, since the third-party user generating changes in the multi-path profile of the radio link should affect the single radio path. Statistically, this happens less often when compared to the case in which several paths are affecting the link.

In step 230, a determination is made as to whether a set of conditions is true. This may include, for example, determining that both: i) the first value satisfies a first condition and ii) the second value satisfies a second condition. If the condition set is true, a first cyclic prefix length selection procedure 240 is selected and performed. This procedure 240 may include, for example, reducing the cyclic prefix length in comparison to the previous or default cyclic prefix length. Otherwise, a second cyclic prefix length selection procedure 250 is selected and performed. The second selection procedure 250 may be, for example, the normal or default procedures and can include simply selecting a default cyclic prefix length. As such, the cyclic prefix length can be selected based on the conditions of the channel for a given radio link.

Figure 3:
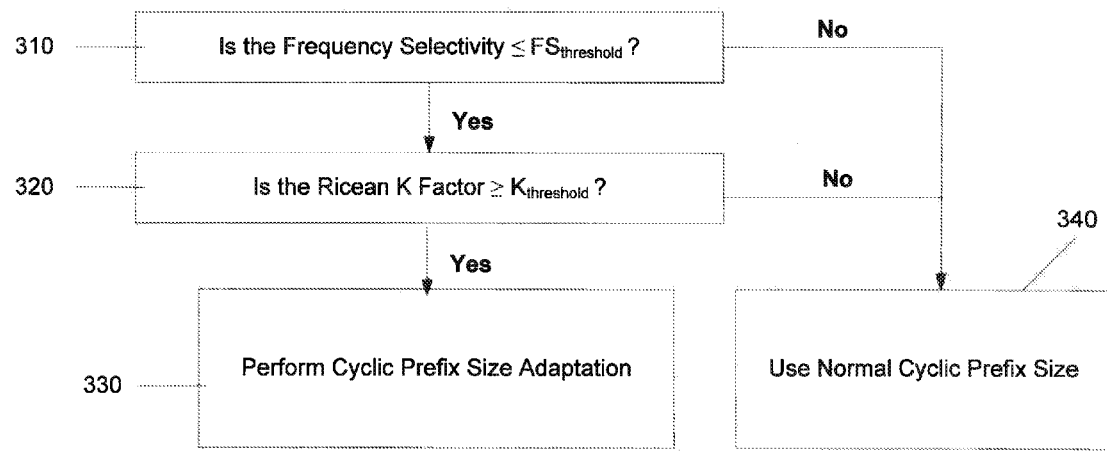
FIG. 3 is a flow chart illustrating a selection process in accordance with exemplary embodiments.

Referring now to FIG. 3, a process 300 for selecting a cyclic prefix length is provided. The process 300 may be performed, for instance, by access node 104, WCD 106, and/or control node 108 to select transmission parameters for communications between WCD 106 and access node 104.

In step 310, it is determined whether the frequency selectivity of the channel is below a threshold frequency selectivity, $FS_{threshold}$.

In step 320, it is determined whether the Rician K factor of the channel is below a threshold value, $K_{threshold}$.

If both the frequency selectivity and Rician K factor satisfy the above requirements, in step 330, a cyclic prefix length adaptation is performed. As with step 240 of process 200, this step may include, for example, reducing the cyclic prefix length in comparison to the previous used length or a default length. If either condition is not met, the default cyclic prefix length is used 340.

According to some embodiments, processes 200 and 300, or one or more steps of process 200 and 300, may be initiated based on the occurrence of one or more events. For instance, the steps described above may take place when a new radio link, or radio resource connection, is established, such as when a link is established between WCD 106 and access node 104. The steps could be triggered, for example, by the receipt of a Radio Resource Control (RRC) Connection Request, as described in 3GPP TS 36.331, in access node 104 from WCD 106. In some embodiments, steps may be triggered when a current link status indicates that the time dispersion of the channel is not short, for instance, if a user is moving quickly towards the cell boarder of a large cell. For example, a UE, such as WCD 106, may report Reference Signal Received Power (RSRP) to the network via a Measurement Report RRC message, indicating that UE is moving towards a cell boarder. Exemplary triggers may also include if the network detects, for instance via channel state reports (CSIs) or Channel Quality Reports (CQIs) that a user is no longer stationary (or moving at low speed). In such a case, it may be beneficial to use a normal cyclic prefix length.

Figure 4:
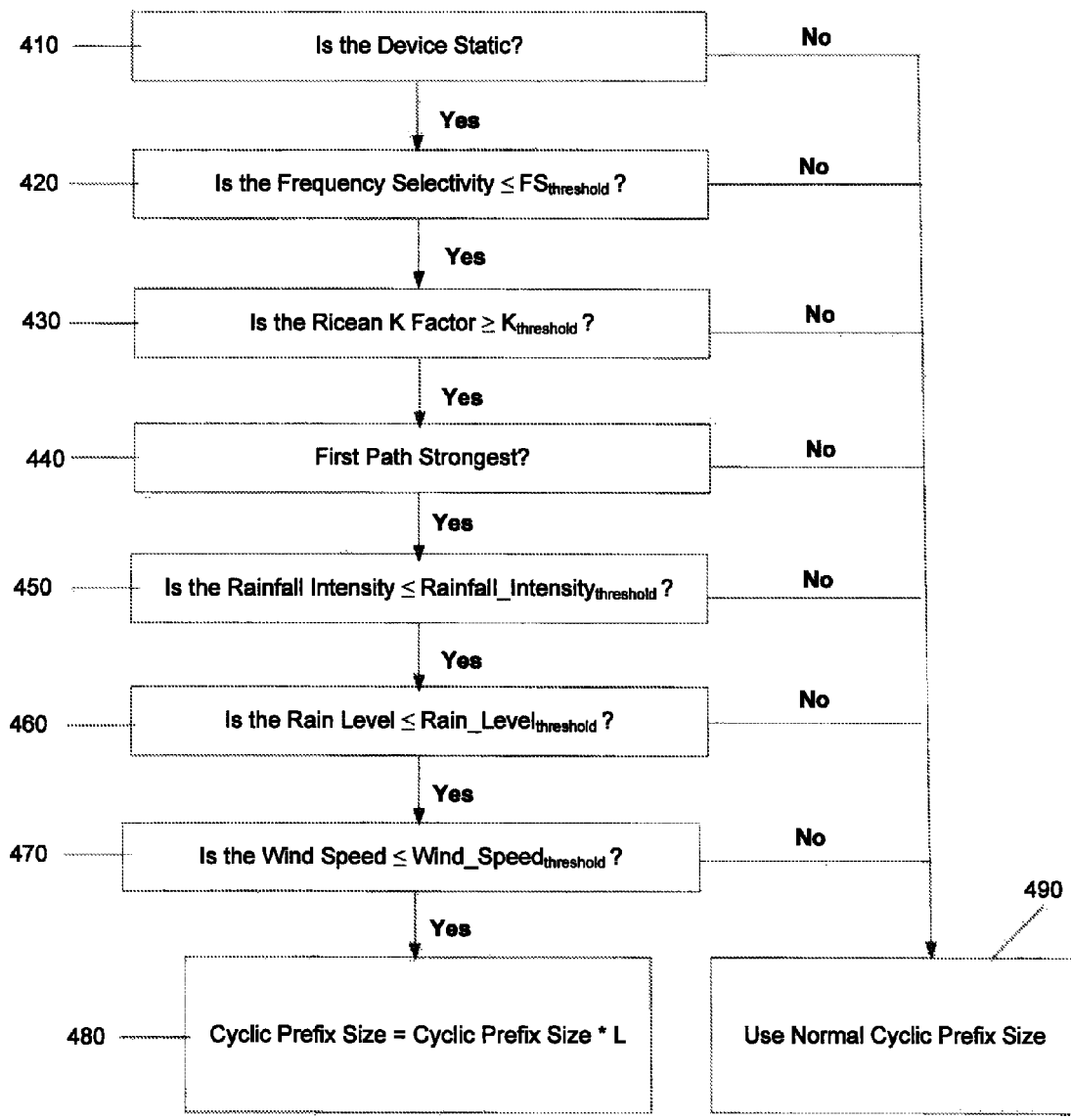
FIG. 4 is a flow chart illustrating a selection process in accordance with exemplary embodiments.

Referring now to FIG. 4, a process 400 for selecting a cyclic prefix length is provided. The process 400 may be performed, for instance, by access node 104, WCD 106, and/or control node 108 to select transmission parameters for communications between WCD 106 and access node 104. According to some embodiments, the exemplary process 400 can utilize information regarding multiple channel taps by observing both the resultant power spectrum and power profile of the taps.

In some embodiments, prior to the selection of a cyclic prefix length, a determination 410 may be made as to whether WCD 106 is a static device. For instance, a control unit 191, 193 may determine directly whether the WCD 106 is static. Mobility information describing mobility capabilities of WCD 106 may also be stored within the network, for instance, at an operation and maintenance (O&M) node, and this information may be provided to the control unit. Similarly, a determination as to whether a device is static may be made prior to steps 210 and 310 of processes 200 and 300, respectively.

If the control unit is responsible for determining 410 the mobility capabilities of the WCD 106, various techniques may be employed to detect the mobility capabilities. Such information may be known beforehand to the WCD 106, or detected by WCD 106 during operation, and then communicated to the control unit. The control unit may also determine the device's mobility capabilities based on device type for WCD 106, location information collected for WCD 106, connection information for WCD 106, such as which base stations the device has connected to over time, handover information for the device, such as whether the device has been involved in a handover or how frequently the device has been involved in a handover, and/or any other appropriate information that may be indicative of the device's mobility capability. There are numerous ways to estimate information indicative of a device's mobility. For example, 3GPP TS 36.331 and TS 36.304 provide methods for estimating speed.

If it is determined that WCD 106 is a static device in step 410, then the control unit may consider various characteristics of the radio channel and/or environment in which the devices are in communication when determining whether to use an adapted cyclic prefix length and proceed to step 420. If it is determined that the wireless link is not between static devices, the control unit may determine that transmissions between devices, such as between access node 104 and WCD 106, should use a default cyclic prefix length as illustrated by step 490.

In step 420, it is determined whether the frequency selectivity of the channel is below a threshold frequency selectivity, $FS_{threshold}$. According to some embodiments, measurement of the frequency selectivity, FS, of the channel can be accomplished without significant complexity. For instance, the channel frequency response, H, of the channel can be measured for a given time window, either by frequency or sub-band. The network, such as the control unit, can then evaluate the frequency channel and sub-band responses, H(f), such as estimating ratios, as well as estimating any difference or variation in H(f). These evaluations and estimates can provide an indication of frequency selectivity. In the case where the frequency selectivity of the channel is low, it may be assumed that very few paths of distinctive delay, and with sufficient energy, e.g., 3 dB above reference, will be observed.

Another indication of frequency selectivity is the frequency distance of "deep fading," or minimal channel response values. In the case where the frequency distance of these values is low, the channel is likely one with high frequency selectivity. In contrast, if the deep fading samples are far apart in frequency, it is implied that the channel has low frequency selectivity.

If the frequency selectivity is not less than or equal to the threshold value, $FS_{threshold}$, the process 400 moves to step 490. If the threshold is satisfied, the process 400 moves to step 430, where the control unit can consider other aspects of the channel.

In step 430, it is determined whether the Rician K factor of the channel is below a threshold value, $K_{threshold}$. Techniques for measuring the K factor of a channel are well known in the art. For instance, the K factor may be measured per sub-band. Presently, in LTE, the K factor can be measured per physical resource block (FRB) of 180 kHz. If the Rician K factor is less than a threshold value, $K_{threshold}$, the process 400 moves to step 490. If the threshold is met or exceeded, the process 400 moves to step 440, where the control unit can begin to consider aspects of the channel. A high K factor indicates that the observed secondary paths have much less energy than the strongest path. As such, it may be assumed that the few delayed channel taps will be statistically of short delay. Although exemplary process 400 is illustrated using the value of the K factor, other evaluations of the K factor may be used, such as variance in the K factor as an indication of the frequency channel selectivity.

In some embodiments, for further robustness, it may be that a cyclic prefix length adaption (e.g., reduction) should only be implemented if the frequency diversity is low, there is a high K factor value, and the strongest component path is the one that arrives first in time. In this case, at step 440 (which is an optional step of process 400), it is determined whether the first path is the strongest. In some embodiments, if not, the process 400 moves to step 490. If the first path is the strongest, the process 400 moves to step 440, where the control unit can begin to consider aspects of weather conditions that may affect the channel In steps 450, 460, and 470, a number of weather conditions may be evaluated (i.e., one or more of steps 450, 460 and 470 are optional). Weather and other environmental aspects may introduce variation of dispersion effects into the radio link that, in turn, may necessitate the need for a full cyclic prefix, as opposed to a reduced length prefix.

In step 450, the control unit evaluates a rainfall intensity, for instance, the rainfall intensity at an access node, a wireless device, or the space in between the nodes. The rainfall intensity may be, for example, the amount of rain in the last hour or other suitable time frame. The intensity may be given, for instance, in units of mm/hr. If the rainfall intensity is not less than or equal to a threshold rainfall intensity value, $Rainfall\_Intensity_{threshold}$, the process 400 moves to step 490. If the threshold is satisfied, i.e., the rainfall intensity is less than or equal to $Rainfall\_Intensity_{threshold}$, the process 400 moves to step 460.

In step 460, the control unit evaluates a rain level, for instance, the rain level at an access node, a wireless device, or the space in between the nodes. The rain level may be, for example, the amount of rain currently, or in the last T seconds or M minutes. If the rain level is not less than or equal to a threshold rain level value, $Rain\_Level_{threshold}$, the process 400 moves to step 490. If the threshold is satisfied, i.e., the rain level is less than or equal to $Rain\_Level_{threshold}$, the process 400 moves to step 470. According to some embodiments, the control unit may consider less recent rain fall, e.g., over the most recent few hours, as previous rainfall may still affect the wireless link. For example, leaves on nearby trees may still be wet from rain in the previous hours, which can affect multipath propagation. Similarly, if there has been a high average rainfall in the previous hours, requirements for the current rain level (e.g., $Rain\_Level_{threshold}$) may be relaxed. This relationship between current and recent conditions may be applied to other conditions, such as wind speed in the following step.

In step 470, the control unit evaluates a wind speed, for instance, the wind speed at an access node, a wireless device, or the space in between the nodes. If the wind speed is not less than or equal to a threshold wind speed value, $Wind\_Speed_{threshold}$, the process 400 moves to step 490. If the threshold is satisfied, i.e., the wind speed is less than or equal to $Wind\_Speed_{threshold}$, the process 300 moves to step 480.

In step 480 the cyclic prefix length is calculated. In the example of process 400, the cyclic prefix length is calculated by multiplying the current prefix length, e.g., the default prefix length, by an adaptation factor L. The selected cyclic prefix length may be reduced by using a value between 0 and 1 for adaptation factor L.

In some embodiments, the adaptation factor L can be set based, at least in part, on the K factor. For instance, L may be determined according to:

$$L = (1-\alpha) \cdot K \quad (1)$$

where $\alpha$ is a weighting factor having a value between 0 and 1. In certain aspects, the value of $\alpha$ may increase with an increase in K. Also, the value of L used in step 480 may be determined according to the time delay between the strongest and second strongest path of the radio channel. In order to improve robustness, the value of L may be set, for example, in such a way that the resulting cyclic prefix length is higher, or at least equal to, the longest path component delay.

According to some embodiments, the cyclic prefix length can be decided based on line of sight (LOS) detection. For instance, cyclic prefix adaptation could be performed only in the case of LOS detection, and in some cases, only with a combination of LOS detection and a high K factor.

According to some embodiments, processes 200, 300, and 400 may be executed at a network node, a base station, a gateway, a relay node, a light base station, or an anchor WCD or device. In certain embodiments, the device executing the process may be equipped with one or more weather sensors, such as a rain or wind measurement device. In some embodiments, the process may be implemented within a slave communicating entity. The weather information may be exchanged, for instance, between the master and slave communicating entity.

In some embodiments, the selection of a cyclic prefix length may be based, at least in part, on a consideration of the size of the cell in which the communication takes place. For example, in the case of a large cell size, a longer prefix length may be used. However, in the case of a smaller cell, a smaller prefix length may be used. This may be in combination with one or more considerations discussed above, for instance, as described in connection with process 400. For instance, the size of the cell may affect the value of adaptation factor L in step 480.

In some embodiments, the cyclic prefix of a radio connection/link is set up based at least in part on the geographical and/or radio distance of the radio link. This may be, for example, in combination with one or more of the considerations described above. The defined cyclic prefix length can be used throughout the connection in case of static devices. This method is particularly well suited for direct device to device connections between static sensors for example, or even for direct device to device connection for moving devices and for which the radio distance is limited, such as two moving cars in near proximity to each other.

In another embodiment, the procedure of cyclic prefix setting for a wireless link between static devices, entities, network nodes, terminals, etc. can be done only once, and the same cyclic prefix is used for any subsequent session/connection established between these same entities. However, in some embodiments, the cyclic prefix is set according to one or more considerations discussed herein, and subsequently updated. For example it could be updated if the distance between communicating entities changes, one or more environmental condition changes, or the serving cell changes, or in case of static devices, the block error rates changes.

According to certain aspects of the disclosure, the cyclic prefix length can be broadcast by one or more nodes of a cell. For instance, it may be broadcast by node 104 and used by any user communicating in the cell served by node 104.

In some embodiments, the cyclic prefix length to be used in a new cell is transmitted to the terminal. For example, in the case of a handover, the prefix length of the new cell is transmitted to the terminal in connection with the handover command. According to some embodiments, the cyclic prefix used in the cell is transmitted to one or more neighboring base stations using the communication interface between base stations. For example, in LTE and its evolutions, this interface is referred to as the X2 and the X2 Application protocol, which is specified in TS 36.423. According to certain aspects, handover decisions can be performed based at least in part on consideration of cyclic prefix length in candidate neighbor cells. This may be in addition to the consideration of other input parameters, such as received signal strength.

In some embodiments, the cyclic prefix adjustments proposed in the methods above are not applicable to the synchronization channel, since this channel is the initial channel that terminals/devices have to listen to upon switching off of or initial access to a network. As such, the most efficient option could be that a single cyclic prefix is used for the synchronization channel. According to some embodiments, however, a limited number N of cyclic prefix lengths may be used for the synchronization channel. One or more of the N different lengths may be hard coded in the terminals/sensors, and applied upon synchronization.

According to some embodiments, each new cyclic prefix length is decided at the network and the selected cyclic prefix length is either directly signaled to the terminal/device, for instance, to be applied at the next transmission interval, or broadcasted via the broadcast channel, or signaled to terminals via the synchronization channel, or paged.

According to some embodiments, a set of cyclic prefix lengths is defined. This set me be known by one or more of the connected devices. For example, a terminal or base station may have the set of pre-defined lengths stored in a memory. During an adaptation, for instance, as outlined in FIGS. 2-4, one value within the set can be applied. In some embodiments, a value of the set may be modified based upon one or more consideration discussed above.

Figure 5:
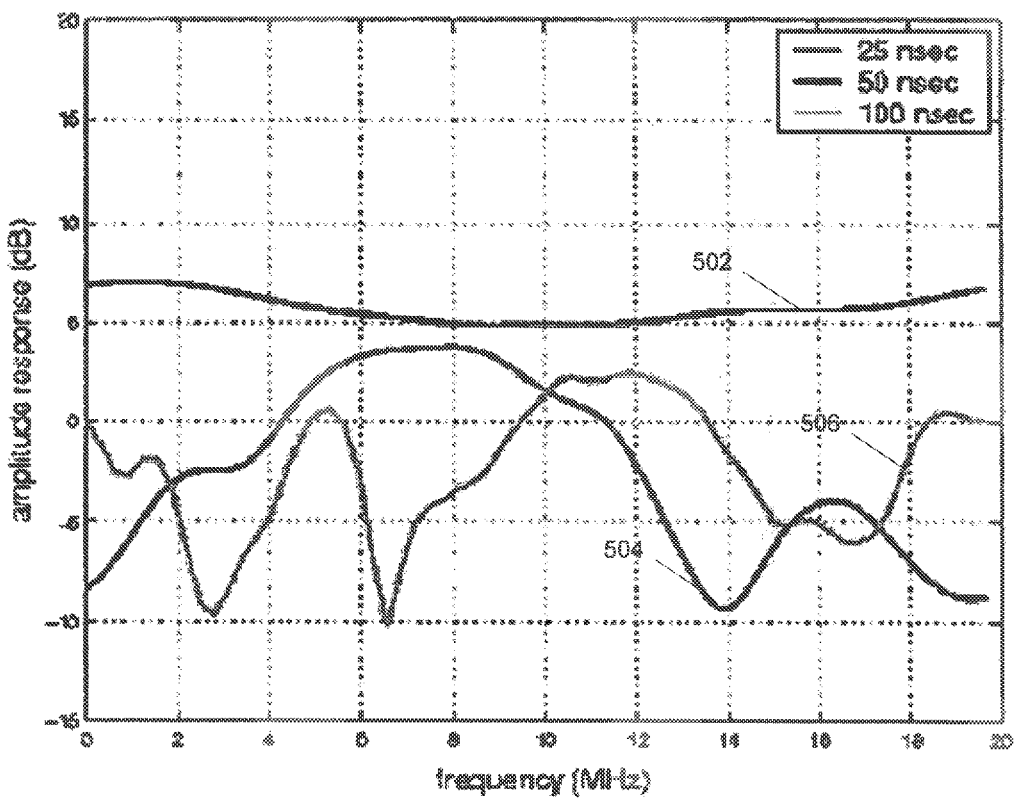
FIG. 5 is an illustration of a channel frequency response in accordance with exemplary embodiments.

Referring now to FIG. 5, an illustration of the channel frequency response 500 due to the multipath phenomenon is provided. This figure illustrates how the channel frequency response can be used to extract information on the delay spread of the channel. As the root-mean-square (rms) delay spread increases, for example from 502 to 504 to 506, the frequency selectivity of the channel becomes more pronounced, i.e., the amount of fading fluctuates more widely from one frequency zone to another. Thus, by observing the frequency distance of two "deeps" or fades in the frequency channel response, the delay spread can be approximated. For instance, the frequency distance between two consecutive deeps, such as in response 506, can correspond to the inverse of the delay spread. Additionally, the number of threshold level crossings within a given time window can also be used to estimate the channel frequency selectivity.

Example

Certain aspects of the present disclosure may be further understood with respect to the following example. This example illustrates a selection method that evaluates the frequency selectivity, and hence the time dispersion, of the channel by only checking the amplitude difference/variance and without checking the phase of the channel frequency. This method may be particularly suitable, for example, for instances in which the channel is primarily composed of only two strong paths. This is often the case for stationary devices/sensors, or for users moving at low speeds within small cells.

In the present example, consider a two ray channel model with carrier frequencies, fc, of 1.9, 1.91, 1.92, . . . , 3.5 GHz. The channel response in the frequency domain, H, may be a function of one or more of the channel bandwidth, fb, the delay of the second tap compared to the first tap, $\Delta t$, the difference in phase of the second tap compared to the phase of the first tap, $\Delta \phi$ and the relative power reduction of the second path with respect to the first/strongest path, $\rho$. For instance, the channel response may given by:

$$H(fb, \Delta t, \Delta\phi, \rho) = (1 + e^{i2\pi \cdot fb \cdot \Delta t} \cdot e^{i\phi} \cdot \rho) \quad (2)$$

where 1 represents for the channel response due to the first/strongest path and the factor $e^{i2\pi \cdot fb \cdot \Delta t} \cdot e^{i\phi} \cdot \rho$ represents the second delay component. Specifically, the term $e^{i2\pi \cdot fb \cdot \Delta t}$ can correspond to the frequency shift due to the delayed tap, the term $e^{i\phi}$ can correspond to the phase shift created by the second/delayed path, and the term $\rho$ can stand for the relative attenuation of the second path when compared to the first. In this example, $$\Delta\varphi = \theta \cdot \frac{\pi}{180} \quad (3)$$

where $\theta$ is the angle given in radius.

Using the bandwidth, fb, as an example, it can range around a central carrier. For example, within LTE, fb ranges between −10 to 10 MHz around the central carrier frequency. Assuming for this example that it can range within LTE between −10 to 10 MHz around the central carrier frequency, the attenuation relative to the first path, $\rho$, is equal to 0.5, i.e., the second path arrives with half of the signal amplitude of the first strongest path and with a delay, $\Delta t$, equal to 100 nanoseconds (or 0.1 microseconds).

Figure 6:
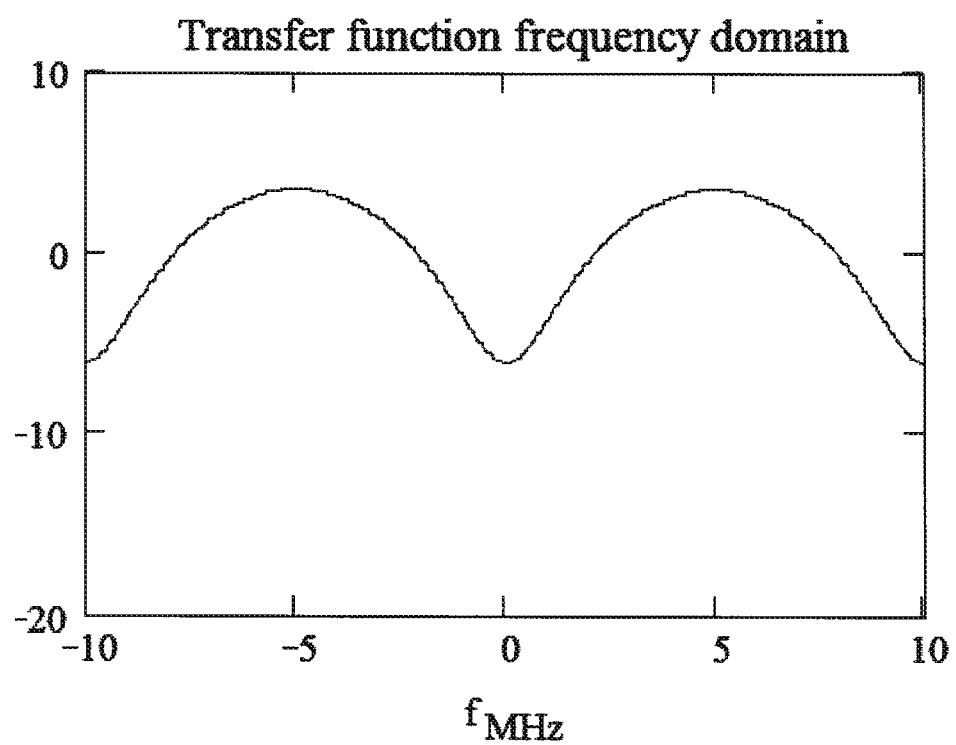
FIG. 6 is an illustration of a transfer function in accordance with exemplary embodiments.

In terms of power strength, 20 log($\rho$) is equal to −6.021. The transfer function in the frequency domain, 20·log(|H(fb, $\Delta t$, $\Delta\phi$, $\rho$)|), is illustrated in FIG. 6.

For purposes of this example, it may be assumed that the frequency bandwidth is set around DC with the aid of the function $$Fq = \frac{q}{4} - 10 \quad (4)$$

where q ranges from 0 to 80 MHz. It is also assumed that this is the bandwidth of interest is 20 MHz with a sampling rate of 250 kHz, i.e., 80 samples within this bandwidth.

The absolute value of the transfer function in the frequency domain, $Yabs_q$, is given by $$Yabs_q = 20 \cdot \log(|H(fq, \Delta t, \Delta\phi, \rho)|) \quad (5)$$

the mean absolute value of the transfer function is $$Ymean = mean(Yabs), \quad (6)$$

and the mean absolute value of the corrected transfer function is $$Yabsmeancorrected_q = Yabs_q - Ymean \quad (7)$$

This expression may be used, for instance, to get a normalized expression of the amplitude.

Subsequently performing a Fourier transform on Yabsmeancorrected gives:

$$YC = CFFT(Yabsmeancorrected), \quad (8)$$

and the Fourier transform of Yabs is given by:

$$YC2 = CFFT(Yabs) \quad (9)$$

Then, for a given bandwidth q, the Fourier transform of Yabsmeancorrected and Yabs is given by YCq and YC2q, respectively, where:

$$YCq = (|YCq|)^2, \quad (10)$$

and $$YC2q = (|YC2q|)^2 \quad (11)$$

if YCC is the inverse Fourier Transform of YC. In other words:

$$YCC = IFFT(YC) \quad (12)$$

and similarly $$YCC2 = IFFT(YC2) \quad (13)$$

The inverse Fourier transform of the Fourier transform is essentially equivalent to the autocorrelation function of the transfer function in frequency domain.

If the ratio of the real part of the inverse Fourier transform of the Fourier transform, i.e., the autocorrelation function of the frequency channel response of the mean absolute value of the corrected transfer function in the case of q bandwidth (Re{YCCq}), to the real part of the inverse Fourier transform to the mean absolute value of the corrected transfer function in the case of 0 bandwidth, (Re {YCC$_0$}), is taken and the same ratio as the one above for the mean power value (in addition to the corrected one) is used, then a good estimation of the frequency selectivity of the channel can be obtained. This result can be seen, for example, in FIG. 7.

Figure 7:
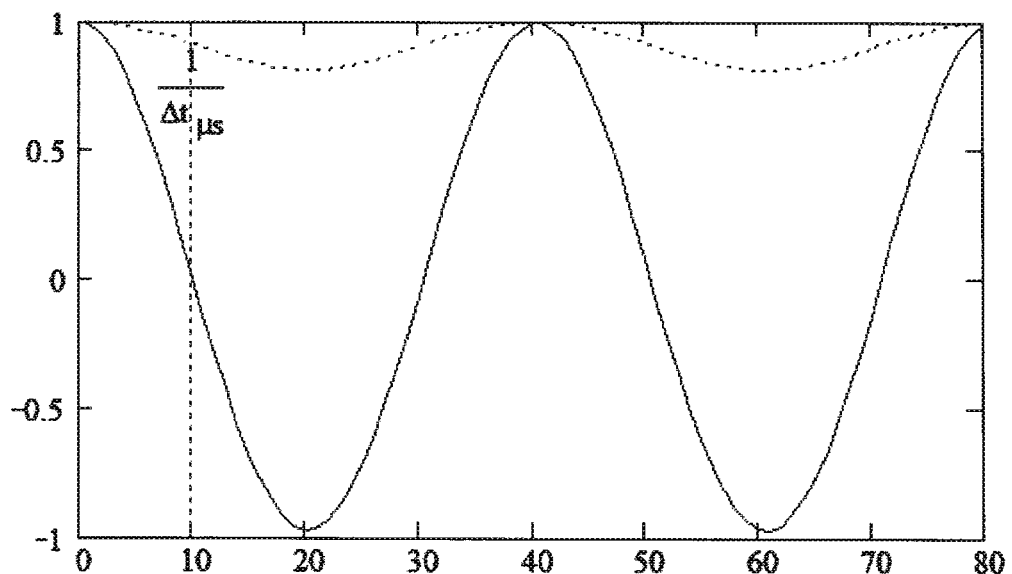
FIG. 7 is an illustration of a transfer function in accordance with exemplary embodiments.

It is noted that division with autocorrelation for 0 bandwidth may be done in order to get a normalized value. It can be seen that both ratios follow the same form/pattern. It can also be seen that both peaks and deeps in the graphs are observed at the same frequency for both curves. By measuring/observing the 0 autocorrelation value of the frequency channel response of the corrected mean value, it is possible to obtain the frequency, q, which corresponds to the delayed tap. This frequency q is the inverse of the delay q=1/$\Delta t$, as is shown in FIG. 7.

The delay spread can then be estimated according to:

$$\sigma := \sqrt{\frac{1 \cdot 0^2 + \rho^2 \cdot \Delta t_{\mu s}^2}{1 + \rho^2} - \left(\frac{1 \cdot 0 + \rho^2 \cdot \Delta t_{\mu s}}{1 + \rho^2}\right)^2} \quad (14)$$

which yields $\sigma = 0.04$ for a $\Delta t$ of 0.1 μs.

As is clear from the foregoing, one possible advantage of the methods, devices, and computer program products disclosed here in the minimization of signaling overhead associated with certain communications. Consider, for instance, a wireless link between a static wireless device and a node in an urban area, where the link exhibits a high Rician K factor, LOS component, and a maximum delay spread equal to 2 μs. By setting the cyclic prefix length to this length, in an LTE Advanced inspired system, the cyclic prefix overhead can be reduced to 2.9%, instead of 6.59% and 7.24%. Another major benefit is that the adaptation can be performed only when it is needed, and with manageable complexity, since the disclosed methods avoid the detailed estimation of max delay spread through the channel impulse response in frequency.

Figure 8:
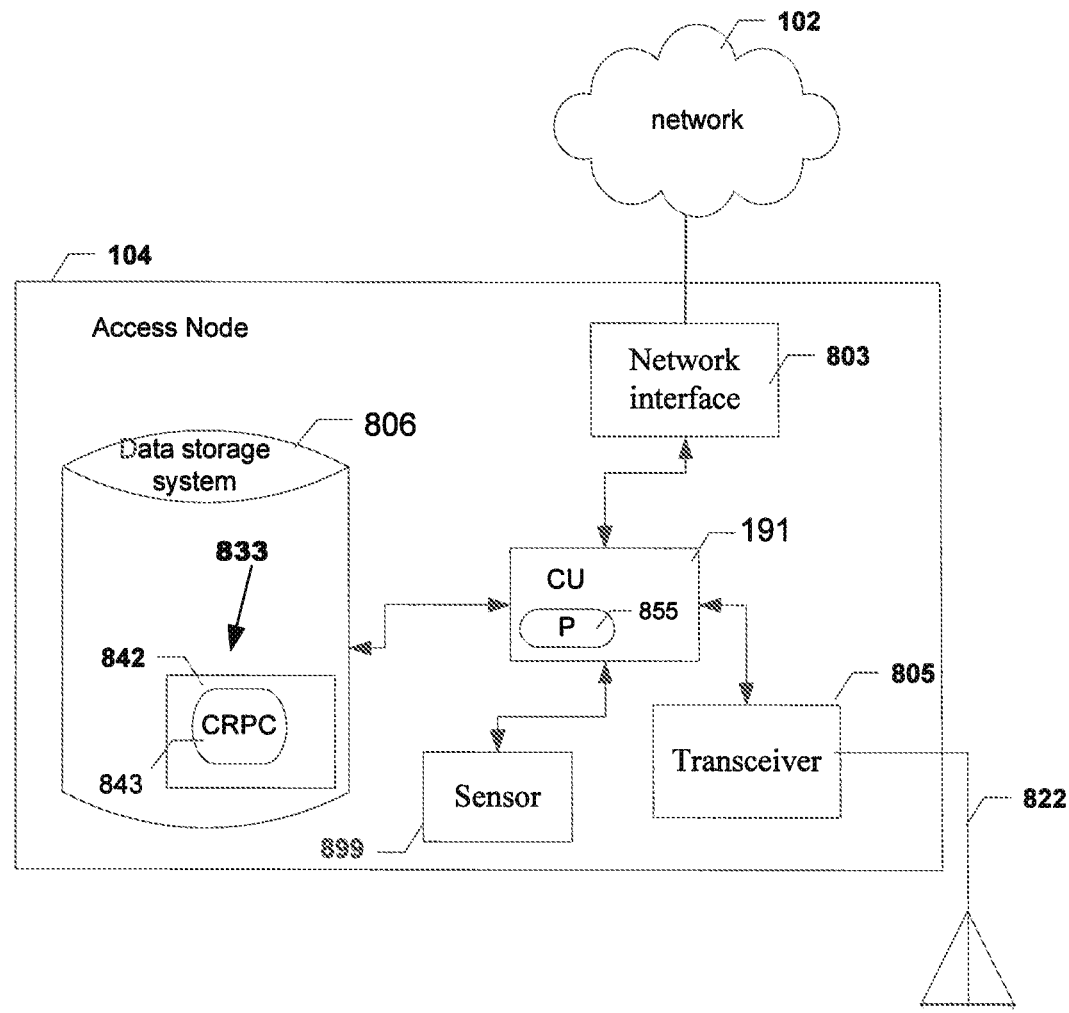
FIG. 8 is a block diagram of an access node in accordance with exemplary embodiments.

FIG. 8 illustrates a block diagram of an example access node 104. In the embodiment shown in FIG. 8, access node 104 includes: control unit (CU) 191 (e.g., a data processing system), which may include one or more processors (P) 855 (e.g., microprocessors) and/or one or more circuits, such as an application specific integrated circuit (ASIC), Field-programmable gate arrays (FPGAs), etc.; a sensor 899 for sensing environmental conditions (e.g., wind, rain); a network interface 803 for connecting the access node 104 to network 102; a transceiver 805 coupled to an antenna 822 for wireless communicating with, for example, WCD 106; a data storage system 806, which may include one or more computer-readable data storage mediums, such as non-transitory memory unit (e.g., hard drive, flash memory, optical disk, etc.) and/or volatile storage apparatuses (e.g., dynamic random access memory (DRAM)).

In embodiments where control unit 191 includes a processor 855 (e.g., a microprocessor), a computer program product 833 may be provided, which computer program product includes: computer readable program code 843 (e.g., instructions), which implements a computer program, stored on a computer readable medium 842 of data storage system 806, such as, but not limited to, magnetic media (e.g., a hard disk), optical media (e.g., a DVD), memory devices (e.g., random access memory), etc. In some embodiments, computer readable program code 843 is configured such that, when executed by control unit 191, code 843 causes the control unit 191 to perform steps described herein (e.g., steps shown in FIGS. 2, 3, and/or 4).

In some embodiments, access node 104 is configured to perform steps described above without the need for code 843. For example, control unit 191 may consist merely of specialized hardware, such as one or more application-specific integrated circuits (ASICs). Hence, the features of the present invention described above may be implemented in hardware and/or software. For example, in some embodiments, the functional components of network node described above may be implemented by control unit 191 executing program code 843, by control unit 191 operating independent of any computer program code 843, or by any suitable combination of hardware and/or software.

Figure 9:
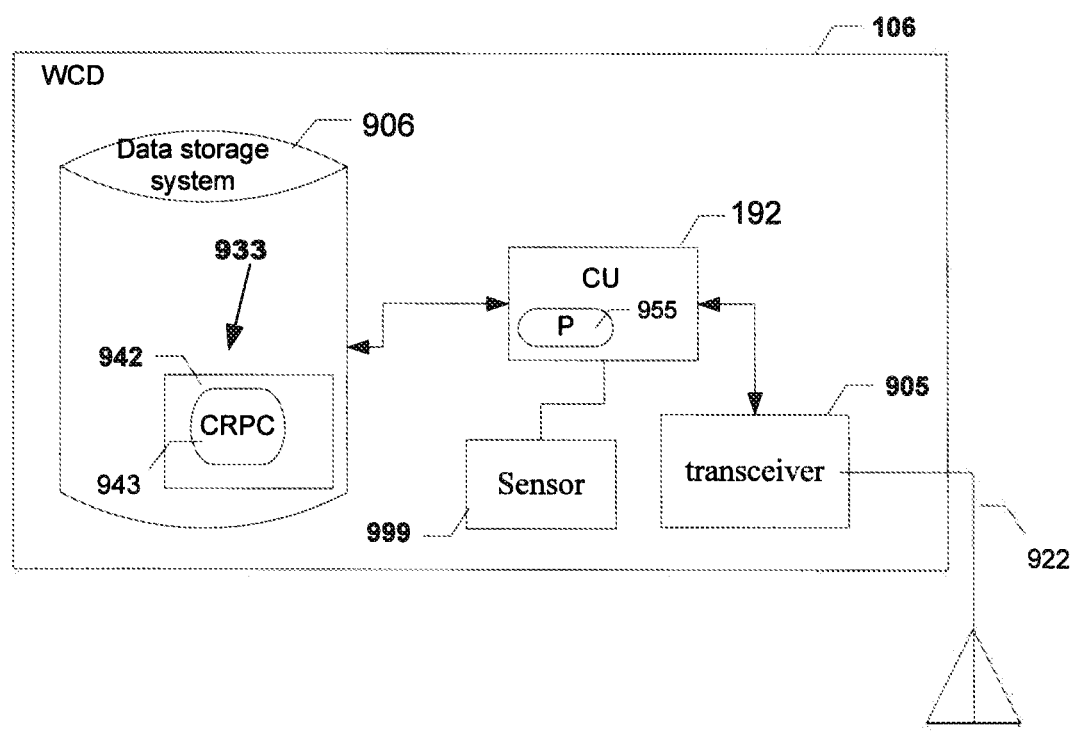
FIG. 9 is a block diagram of a wireless device in accordance with exemplary embodiments.

FIG. 9 illustrates a block diagram of an example WCD 106. In the embodiment shown in FIG. 9, WCD 106 includes: control unit 192 (e.g., a data processing system), which may include one or more processors (P) 955 (e.g., microprocessors) and/or one or more circuits, such as an application specific integrated circuit (ASIC), Field-programmable gate arrays (FPGAs), etc.; a sensor 999 for sensing environmental conditions (e.g., wind, rain); a transceiver 905 coupled to an antenna 922 for wireless communicating with, for example, access node 104; a data storage system 906, which may include one or more computer-readable data storage mediums, such as non-transitory memory unit (e.g., hard drive, flash memory, optical disk, etc.) and/or volatile storage apparatuses (e.g., dynamic random access memory (DRAM)). WCD 106 may represent any suitable device capable of wireless communication including, but not limited to, a mobile communication device (e.g., a cellular telephone or wireless-enabled computer), an installed wireless communication device (e.g., an MTC or M2M communication device), or a component of a radio access network (e.g., a base station, an enhanced NodeB, or a relay node).

In embodiments where control unit 192 includes a processor 955 (e.g., a microprocessor), a computer program product 933 may be provided, which computer program product includes: computer readable program code 943 (e.g., instructions), which implements a computer program, stored on a computer readable medium 942 of data storage system 906, such as, but not limited to, magnetic media (e.g., a hard disk), optical media (e.g., a DVD), memory devices (e.g., random access memory), etc. In some embodiments, computer readable program code 943 is configured such that, when executed by control unit 192, code 943 causes the control unit 192 to perform steps described herein (e.g., steps shown in FIGS. 2, 3, and/or 4).

In some embodiments, WCD 106 is configured to perform steps described above without the need for code 943. For example, control unit 192 may consist merely of specialized hardware, such as one or more application-specific integrated circuits (ASICs). Hence, the features of the present invention described above may be implemented in hardware and/or software. For example, in some embodiments, the functional components of network node described above may be implemented by control unit 192 executing program code 943, by control unit 192 operating independent of any computer program code 943, or by any suitable combination of hardware and/or software.

Figure 10:
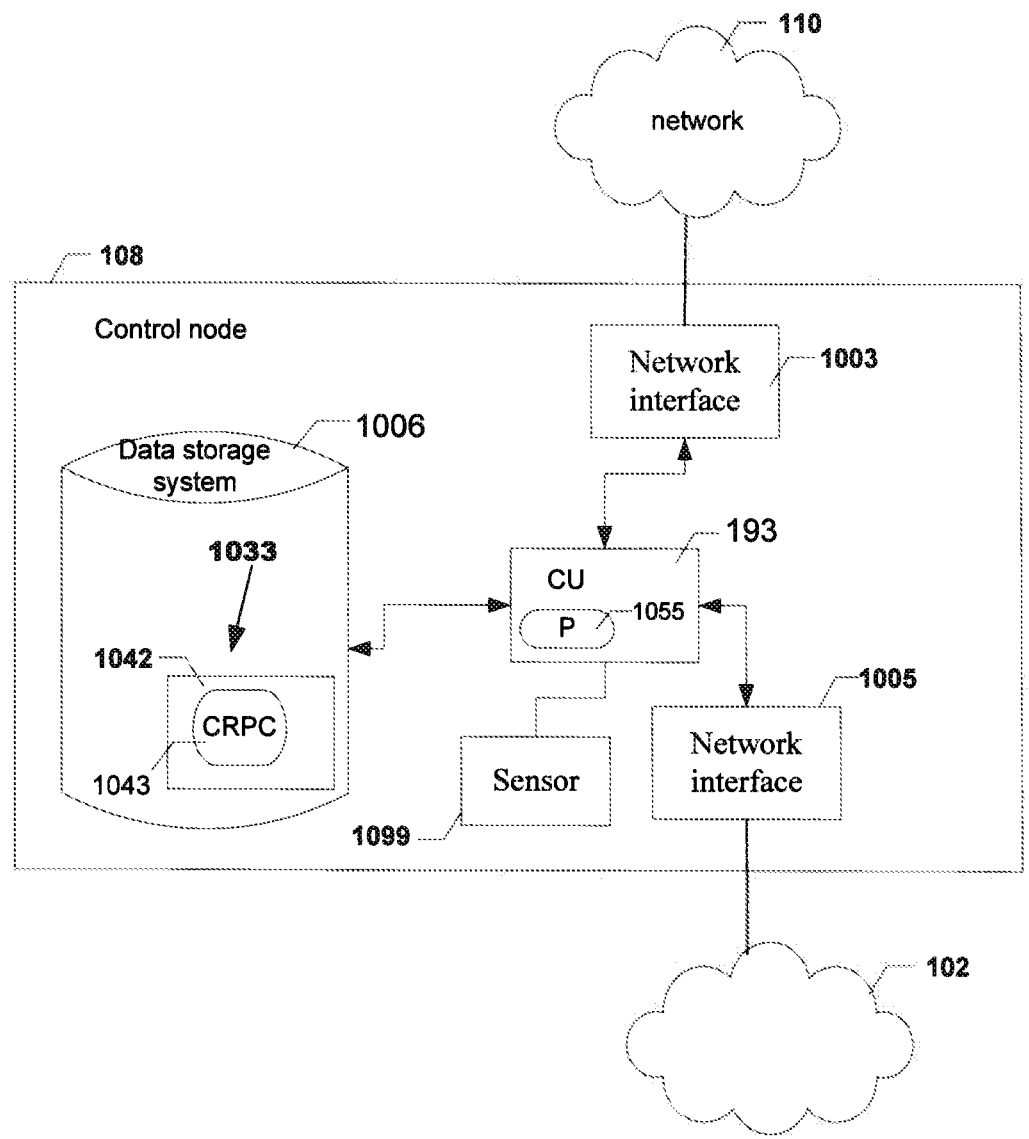
FIG. 10 is a block diagram of a control node in accordance with exemplary embodiments.

FIG. 10 illustrates a block diagram of an example control node 108. In the embodiment shown in FIG. 10, control node 108 includes: control unit 193 (e.g., a data processing system), which may include one or more processors (P) 1055 (e.g., microprocessors) and/or one or more circuits, such as an application specific integrated circuit (ASIC), Field-programmable gate arrays (FPGAs), etc.; a sensor 1099 for sensing environmental conditions (e.g., wind, rain); a network interface 1003 for connecting the control node 108 to a network 110 (e.g., a packet data network); a network interface 1005 for connecting to network 102; a data storage system 1006, which may include one or more computer-readable data storage mediums, such as non-transitory memory unit (e.g., hard drive, flash memory, optical disk, etc.) and/or volatile storage apparatuses (e.g., dynamic random access memory (DRAM)).

In embodiments where control unit 193 includes a processor 1055 (e.g., a microprocessor), a computer program product 1033 may be provided, which computer program product includes: computer readable program code 1043 (e.g., instructions), which implements a computer program, stored on a computer readable medium 1042 of data storage system 1006, such as, but not limited to, magnetic media (e.g., a hard disk), optical media (e.g., a DVD), memory devices (e.g., random access memory), etc. In some embodiments, computer readable program code 1043 is configured such that, when executed by control unit 193, code 1043 causes the control unit 193 to perform steps described herein (e.g., steps shown in FIGS. 2, 3, and/or 4).

In some embodiments, control node 108 is configured to perform steps described above without the need for code 1043. For example, control unit 193 may consist merely of specialized hardware, such as one or more application-specific integrated circuits (ASICs). Hence, the features of the present invention described above may be implemented in hardware and/or software. For example, in some embodiments, the functional components of network node described above may be implemented by control unit 193 executing program code 1043, by control unit 193 operating independent of any computer program code 1043, or by any suitable combination of hardware and/or software.

While various embodiments have been described above, it should be understood that they have been presented by way of example only, and not limitation. Thus, the breadth and scope of the present disclosure should not limited by any of the above-described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The invention claimed is:

1. A method for selecting a cyclic prefix length in a communications network comprising a first wireless communication device (WCD) and a second WCD, the method comprising:

obtaining, at a control unit, a first value indicative of a time dispersion of a radio channel between the first WCD and the second WCD;

obtaining, at the control unit, a Rician K factor (K) corresponding to a relative strength of a direct signal received at one of the first WCD and the second WCD to scattered components of said signal;

determining, by the control unit, whether a set of conditions is true, wherein said determining comprises: i) determining whether said first value satisfies a first condition and ii) determining whether said Rician K factor satisfies a second condition; and selecting, by the control unit, one of a first cyclic prefix length selection procedure and a second cyclic prefix length selection procedure, which is different than the first cyclic prefix length selection procedure, wherein the selection of the cyclic prefix length selection procedure is based at least in part on whether the Rician K factor satisfies the second condition and the first value satisfies the first condition.

2. The method of claim 1, wherein
said first value indicates a frequency selectivity of the radio channel, and
said determining whether said first value satisfies the first condition comprises determining whether said first value is not greater than a threshold frequency selectivity value.

3. The method of claim 1, wherein determining whether said Rician K factor satisfies the second condition comprises determining whether said Rician K factor is not less than a threshold value.

4. The method of claim 1, wherein the control unit is a component of one of: said first WCD, said second WCD, and a control node.

5. The method of claim 1, wherein said determining whether said set of conditions is true further comprises determining whether said first WCD is a static WCD.

6. The method of claim 1, wherein said first cyclic prefix length selection procedure comprises calculating a cyclic prefix length, for communications between the first WCD and the second WCD by obtaining an adaption parameter value (L) and calculating C*L, where C is a cyclic prefix length used for a previous communication by the first or second WCD.

7. The method of claim 6, wherein the adaptation parameter L has a value between 0 and 1.

8. The method of claim 7, wherein obtaining IL comprises calculating $L(1-\alpha)K$, where $\alpha$ is a value between 0 and 1.

9. The method of claim 6, wherein the adaptation parameter L is set according to a time delay between a first and second path of the radio channel between the first WCD and the second WCD.

10. The method of claim 1, wherein
a signal transmitted by the first WCD travels a plurality of paths to reach the second WCD, the plurality of paths including a first path, wherein the second WCD receives the signal first in time via the first path, and
determining whether the set of conditions is true further comprises determining whether the first path is a strongest of the plurality of paths.

11. The method of claim 1, wherein
said second WCD is a base station, and
said determining whether the set of conditions is true is performed in response to the first WCD attempting to establish a radio link with the base station.

12. The method of claim 11, further comprising:
transmitting, from the base station to the first WCD, an indication of a cyclic prefix length determined as a result of said first cyclic prefix length selection procedure.

13. A control unit for selecting a cyclic prefix length, the control unit comprising:
a processor; and
a memory unit, the memory storing instructions executable by the processor whereby the processor is operative, when executing the stored instructions, to:
obtain a first value that is indicative of a time dispersion of a radio channel between a first wireless communication device (WCD) and a second WCD;
obtain a Rician K factor (K) corresponding to a relative strength of a direct signal received at one of the first WCD and the second WCD to scattered components of said signal;
determine whether a set of conditions is true by, at the least, i) determining whether said first value satisfies a first condition and ii) determining whether said Rician K factor satisfies a second condition;
perform a first cyclic prefix length selection procedure in response to determining that the set of conditions is true; and
perform a second cyclic prefix length selection procedure, which is different than the first cyclic prefix length selection procedure, in response to determining that the set of conditions is not true.

14. The control unit of claim 13, wherein
said first value indicates a frequency selectivity of the radio channel, and
the processor is operative to determine whether said first value satisfies the first condition by determining whether said first value is not greater than a threshold frequency selectivity value.

15. The control unit of claim 13, wherein
the processor is operative to determine whether said Rician K factor satisfies the second condition by determining whether said Rician K factor is not less than a threshold Rician K factor.

16. The control unit of claim 13, wherein the processor is operative to determine whether said set of conditions is true by determining whether said first WCD is a static WCD.

17. The control unit of claim 13, wherein the processor is operative to perform said first cyclic prefix length selection procedure by selecting a cyclic prefix length, SCP, for communications between the first WCD and the second WCD based on an evaluation of: C*L, where C is a cyclic prefix length and L is an adaptation parameter.

18. The control unit of claim 17, wherein C is a cyclic prefix length used for a previous communication by the first or second WCD and the adaptation parameter L has a value between 0 and 1.

19. The control unit of claim 17, wherein the value of the adaptation parameter L is based at least in part on a determination of a Rician K factor of the radio channel between the first WCD and the second WCD.

20. The control unit of claim 17, wherein the processor is operative to set the adaptation parameter L according to a time delay between a first and second path of the radio channel between the first WCD and the second WCD.

21. The control unit of claim 13, wherein the processor is operative to determine whether the set of conditions is true by determining whether a first path via which the second WCD receives a signal first in time is a strongest path among a plurality of paths traveled by the signal from the first WCD to the second WCD.

22. The control unit of claim 13, wherein:
said second WCD comprises a base station, and
the processor is operative to determine whether the set of conditions is true in response to the first WCD attempting to establish a radio link with the base station.

23. The control unit of claim 22, wherein the processor is further operative to
transmit to the first WCD an indication of a cyclic prefix length determined as a result of said first cyclic prefix length selection procedure.

* * * * *

UNITED STATES PATENT AND TRADEMARK OFFICE
CERTIFICATE OF CORRECTION

PATENT NO. : 9,184,968 B2  
APPLICATION NO. : 13/944058  
DATED : November 10, 2015  
INVENTOR(S) : Dimou et al.

Page 1 of 1

It is certified that error appears in the above-identified patent and that said Letters Patent is hereby corrected as shown below:

In the specification,

In Column 8, Line 15, delete "(FRB)" and insert -- (PRB) --, therefor.

In Column 12, Line 4, after Equation (5), insert -- , --.

In the claims,

In Column 16, Lines 8-9, in Claim 8, delete "obtaining IL comprises calculating $L(1-\alpha)K$," and insert -- obtaining L comprises calculating $L=(1-\alpha)K$, --, therefor.

Signed and Sealed this
Twenty-ninth Day of March, 2016

Michelle K. Lee
*Director of the United States Patent and Trademark Office*